United States Patent [19]
Hamaekers

[11] Patent Number: 5,878,494
[45] Date of Patent: Mar. 9, 1999

[54] METHOD FOR MANUFACTURING A MACHINE BEARING

[75] Inventor: Arno Hamaekers, Gorxheimertal-Unterfl., Germany

[73] Assignee: Firma Carl Freudenberg, Weinheim, Germany

[21] Appl. No.: 287,432

[22] Filed: Aug. 8, 1994

[30] Foreign Application Priority Data

Sep. 15, 1993 [DE] Germany .............................. 43 31 331

[51] Int. Cl.⁶ .................................................... B23P 17/00
[52] U.S. Cl. ......................................................... 29/896.93
[58] Field of Search ................................... 29/897, 897.2, 29/896.93, 894.35, 894.353, 894.354, 892.3; 72/368, 379.2, 365.2, 366.2, 243.2, 354.2; 248/621, 622, 638, 669; 228/151; 413/6

[56] References Cited

U.S. PATENT DOCUMENTS

| | | |
|---|---|---|
| 1,466,643 | 8/1923 | Draper .......................................... 413/6 |
| 1,710,930 | 4/1929 | Klaus . |
| 2,382,485 | 8/1945 | Ingersoll ................................ 72/368 X |
| 3,129,505 | 4/1964 | Cox . |
| 3,540,252 | 11/1970 | Pfanner ................................. 72/368 X |
| 3,787,960 | 1/1974 | Greenleaf . |
| 4,236,289 | 12/1980 | Olford ..................................... 29/892.3 |
| 4,361,021 | 11/1982 | McVay et al. . |
| 4,414,728 | 11/1983 | Ford et al. . |
| 5,240,233 | 8/1993 | Kato et al. .......................... 29/897.2 X |
| 5,295,671 | 3/1994 | Nagagaki et al. .................. 248/638 X |
| 5,594,988 | 1/1997 | Fishman ............................. 29/894.353 |

Primary Examiner—S. Thomas Hughes
Attorney, Agent, or Firm—Kenyon & Kenyon

[57] ABSTRACT

A method for manufacturing a machine bearing comprising an elastic spring element made of rubber, in which the elastic spring element is affixed to a ring element made of an elastically deformable material is disclosed. The ring element is produced from a lamellar section of a sheet metal and, after being transformed into the shape of a cylinderical ring, is further transformed into the final shape of the ring element.

9 Claims, 3 Drawing Sheets

METHOD FOR MANUFACTURING A MACHINE BEARING

BACKGROUND OF THE INVENTION

The invention relates generally to a method for manufacturing a machine bearing comprising an elastic spring element made of rubber, particularly to one in which the elastic spring element is affixed to a ring element made of an elastically deformable material.

Such a ring element may be a component of a hydraulically damping machine bearing that is joined to a metallic bearing support. The ring element comprises a mounting flange, which is fastenable to the bearing support, and a seating flange to accommodate the annular elastic spring element. The elastic spring element has a generally hollow-conical shape. On the side facing away from the bearing support, the machine bearing is delimited by a thrust bearing, which is joined to the elastic spring element. In heretofore known methods, the ring element of this type of machine bearing was manufactured by punching an annular disc out of a flat sheet metal part and subsequently giving it the shape required for assembly using a reshaping method, such as deep drawing. This method requires substantial quantities of material, since considerable punching waste is produced when circular rings are punched out of flat sheet metal. Another disadvantage is that the reshaping operation results in the ready-to-fit ring element having sections of varying material strength along its axial extent, the lowest material strengths occurring, depending upon the particular manufacturing method employed, in the area of the lateral edges of the ring element, where the elastic spring element and the bearing support are affixed. This weakening of the material is caused by the plastic stretching it undergoes during reshaping and the resultant loss of thickness in these regions. The working properties of a machine bearing of this type are less than satisfactory, since elastic deformations of the ring element, particularly in the area where the elastic spring element is affixed, lead to a further change in the performance characteristics of the bearing. The material weakening of the ring element can be reduced by using high-quality sheet metal that is capable of being deep-drawn; however, such materials are not very economical to use.

This invention is directed towards the problem of further developing a manufacturing method to produce an article of the type described above that simplifies the manufacture of the ring element and hence, the machine bearing as a whole, so as to substantially reduce the material required to manufacture the ring element while not requiring the use of high-quality deep-drawn sheet metal. Furthermore, the invention is directed towards the problem of providing that such a method result in a ring element that offers an essentially uniform material strength along its extent.

SUMMARY OF THE INVENTION

The manufacturing method according to the invention provides for the ring element to be produced from a lamellar section of a sheet metal and, after being transformed into the shape of a ring, to be transformed into the shape of the ring element. It is advantageous that the material required to manufacture the ring element is kept to a minimum because the method generates no punching waste. The width of the lamellar section of the sheet metal preferably corresponds exactly to the axial dimensions of the ring to be manufactured in the first process step. The lamellar, flat section of the sheet metal is reshaped by sheet metal bending rolls into a ring having essentially a hollow-cylindrical design. This shaping process, by avoiding cutting, provides a ring that is much more durable than punched-out rings. After the lamellar section has been transformed into the shape of a ring, this ring is transformed through reshaping into the shape of the ring element. The particular final shape of the ring element is determined by the specific conditions of the final application to which the ring is put. A ring element having an essentially V-shaped cross-section in which one of the sides of the "V" is provided as a mounting flange for the bearing support and the adjacent side is provided to accommodate the elastic spring element of the bearing is particularly suited for most applications. Depending on the opening angle of the V-shape, the axial flexibility of the machine bearing can be adjusted in conjunction with the flexibility of the elastic spring element being used. The larger the opening angle, the more flexible the machine bearing is in the axial direction for a particular material. The advantage of the method according to the invention is that it provides a ring element having consistent material strength, so that deformations in the area where the ring is affixed to the bearing support or to the elastic spring element are avoided.

The ends of the lamellar starting section can be welded together after the section is transformed into the shape of the ring. In this manner, one can reliably prevent both radial and axial shifting of the two ends relative to one another. Moreover, immovably allocating the two ends relative to one another simplifies the further processing of the ring into the ring element. A further benefit of this step is that any manifestations of strain that occur when the two extremities are welded can be compensated by the subsequent reshaping of the ring into the ring element. On the other hand, it would be disadvantageous to weld the two extremities after the ring element has been manufactured.

The subsequent transformation of the cylinder-shaped ring into the final shape of the ring element can be effected through rolling, pressing and/or widening operations. From a standpoint of production engineering, rolling, in particular, provides a simple method, in which the ring is secured to a rotatable wheel hub having a negative profile designed to correspond to the rollers. To manufacture the ring element, the hub and the ring are rotated about their shared axis, at least one roller being advanced in the radial direction towards the negative profile of the hub until the material of the ring touches upon the surface of the negative profile and the roller. Subsequent to the reshaping operation, the ring exhibits the shape of the desired ring element. The ring element can be calibrated, if needed. For this purpose, this ring element can be widened or compressed in the radial direction. If the ring is transformed by means of pressing into the shape of the ring element, it is advantageous in this case that neither the ring nor the tool for manufacturing the ring element has to be set into a rotary motion.

DETAILED DESCRIPTION

Figure 1:
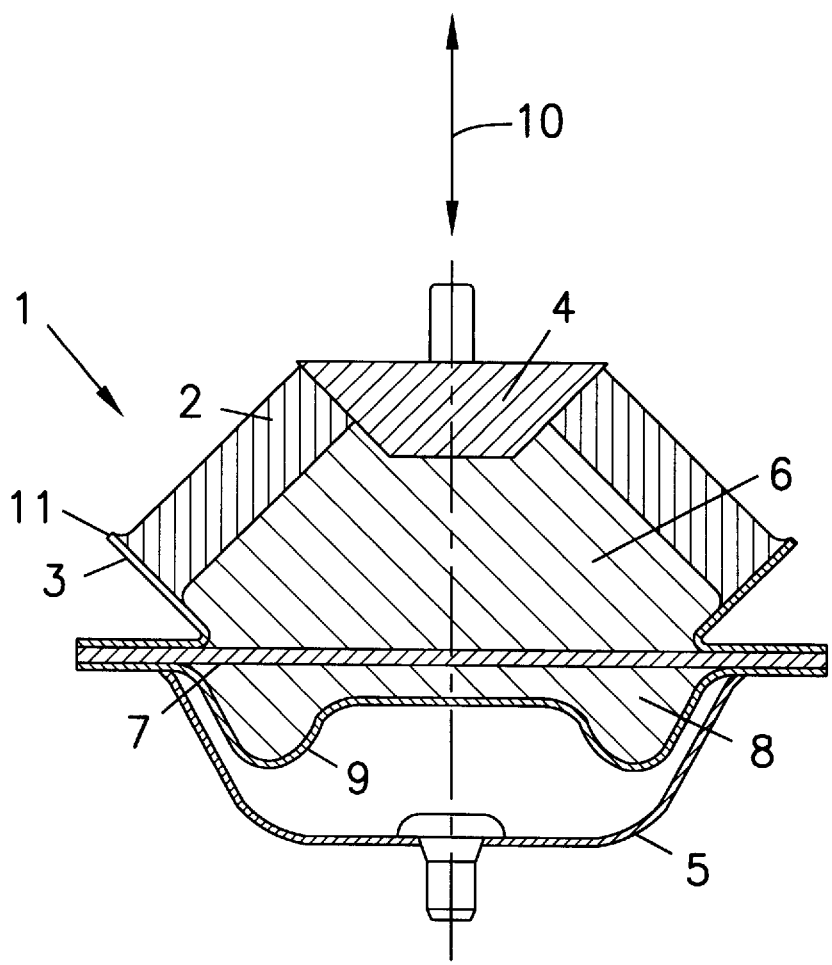
FIG. 1 is a longitudinal sectional view of a first embodiment of a machine bearing constructed according to the principles of the invention, in which the ring is part of a hydrobearing.

The machine bearing 1 schematically depicted in FIG. 1 is a hydrobearing of a customary type of construction, comprising a thrust bearing 4 and a bearing support 5, which are braced against one another with elastic compliance by means of an elastic spring element 2 of rubber elastic material. The working chamber 6 of the hydrobearing is delimited by the thrust bearing 4, the hollow-conical elastic spring element 2, the ring element 3, and the separating wall 7, the working chamber being in fluid communication with an axially adjacent compensation chamber 8. The compensation chamber 8 is delimited in the axial direction on one side by the separating wall 7 and, in the axial direction on the other side, by a rolling-diaphragm-type membrane 9, which is dimensioned and designed to be able to receive liquid components, which are displaced out of the working chamber 6 into the compensation chamber 8, in a virtually nonpressurized manner. When vibrations 10 are introduced into the bearing 1, the working chamber 6 is alternately enlarged and reduced in size. The thrust bearing 4 braced against the elastic spring element 2 is arranged in the axial direction, in dependence upon the vibration, to be relatively movable in relation to the ring element 3. According to the invention, the wall thickness of the ring element 3 is uniform, which prevents any spring deflection of the thrust bearing 4 from resulting in a curved, essentially radial deformation of the edge-side boundary 11 of the ring element 3 to which the elastic spring element 2 is affixed. On the side facing the bearing support 5, the ring element 3 is joined in a fluid-tight manner to the bearing support 5, the separating wall 7 and the membrane 9 being joined in-between thereto.

Figure 2A:
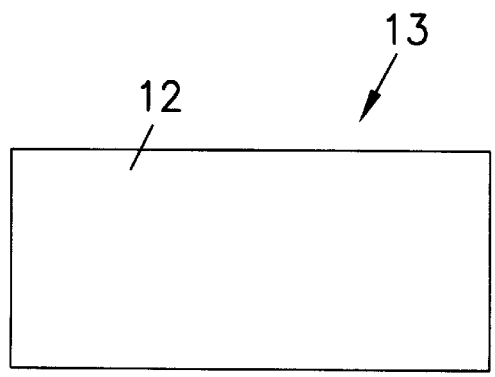
FIGS. 2A and 2B illustrate a cut-away portion of a lamellar section of a sheet metal in a top view (FIG. 2A) and in a cross-section (FIG. 2B).
Figure 2B:
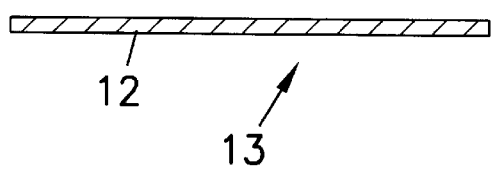
Figure 3A:
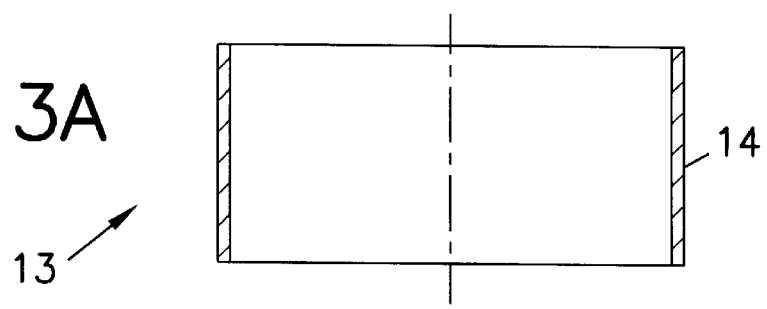
FIGS. 3A and 3B illustrate the form of the lamellar section of FIG. 2 subsequent to its being reshaped into a ring in longitudinal section (FIG. 3A). In this embodiment, the two extremities of the lamellar section are welded together (FIG. 3B).
Figure 3B:
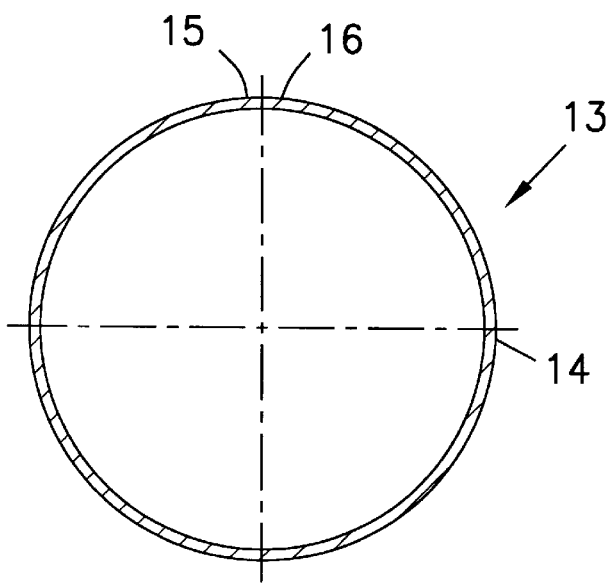

In a top view and in longitudinal section, FIGS. 2A and 2B illustrate a cut-away portion of a lamellar section 12 of a sheet metal 13, prior to its transformation by means of a rounding machine into the shape of a circular ring 14 (FIG. 3A). In FIGS. 3A and 3B, the lamellar section has been rolled into a ring 14, shown in a longitudinal section and top-plan view. Subsequent to the reshaping of the plate into a clyindrical ring 14, the two extremities 15, 16 of the section are affixed relatively immovably to one another to close the ring. This can be achieved, for example, by welding the two extremities 15, 16 together, or by providing them with congruently shaped recesses, which are then forced into engagement via form locking.

Figure 4:
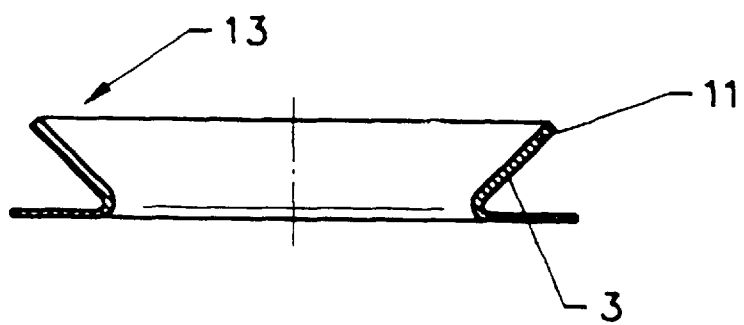
FIG. 4 shows the ring of FIGS. 3A and 3B after it has been further shaped using the method of the invention into the ring element utilized in the bearing of FIG. 1.

In the following process step, the ring is subsequently reshaped into its final, ready-to-fit shape, as shown in FIG. 1. The completed ring element 3 is separately shown in FIG. 4.

The amount of material required to manufacture the ring element 3 is kept to a minimum, since no punching waste is produced during its manufacture. Moreover, over the total area of its entire extent, the thickness of the ring element 3 substantially corresponds to that of the lamellar section 12.

Bearings that employ a ring element 3 produced according to the method of the invention demonstrate excellent working properties over a long service life.

What is claimed is:

1. A method for manufacturing a bearing comprising an elastic spring element made of rubber that is affixed to a ring element made of an elastically deformable material, comprising the steps of:

bending a lamellar section of sheet metal into a cylindrical shape; and deforming the sheet metal into the shape of a ring element having a uniform thickness.

2. The method according to claim 1, further comprising the step of joining the terminal portions of the lamellar section of metal together by welding after the lamellar section has been bent into a cylindrical shape.

3. The method according to claim 1, wherein the step of deforming the metal from a cylindrical shape to the final ring shape is effected through rolling, pressing and/or widening operations.

4. The method according to claim 2, wherein the step of deforming the metal from a cylindrical shape to the final ring shape is effected through rolling, pressing and/or widening operations.

5. A method for manufacturing a metal ring element for use in a bearing, comprising the steps of:

bending a lamellar section of sheet metal into a cylindrical shape; and deforming the sheet metal into a shape comprising a conical portion and a contiguous disk-like portion that is set at an angle with respect to the conical portion so that the ring element is of uniform thickness.

6. The method according to claim 5, wherein the lamellar section has end portions, comprising the step of joining the end portions to one another so as to form the cylindrical shape.

7. The method according to claim 6, wherein the end portions are joined to one another via welding.

8. The method according to claim 5, wherein the step of deforming the metal from a cylindrical shape to the final ring shape is effected through rolling operations.

9. The method according to claim 5, wherein the step of deforming the metal from a cylindrical shape to the final ring shape is effected through a pressing operations.

* * * * *